US012771002B2

(12) United States Patent
Torpey et al.

(10) Patent No.: US 12,771,002 B2
(45) Date of Patent: Oct. 20, 2026

(54) DYNAMIC ULTRA-SELECTIVE WAVEGUIDE FILTER ASSEMBLY

(71) Applicant: NORTHROP GRUMMAN SYSTEMS CORPORATION, Falls Church, VA (US)

(72) Inventors: Matthew S. Torpey, Ellicott City, MD (US); Jordan Stroman, Takoma Park, MD (US); Justin A. Parke, Ellicott City, MD (US); Robert S. Howell, Silver Spring, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 161 days.

(21) Appl. No.: 18/813,971

(22) Filed: Aug. 23, 2024

(65) Prior Publication Data

US 2026/0058349 A1 Feb. 26, 2026

(51) Int. Cl.
*H01P 1/15* (2006.01)
*H01P 1/20* (2006.01)

(52) U.S. Cl.
CPC .............. *H01P 1/2002* (2013.01); *H01P 1/15* (2013.01)

(58) Field of Classification Search
CPC ........ H01P 1/2088; H01P 1/2002; H01P 1/15; H01P 1/10; H01P 1/213; H01P 1/217; H01P 1/215; H01P 1/207; H01P 3/16
USPC .......................................................... 333/137
See application file for complete search history.

(56) References Cited

U.S. PATENT DOCUMENTS

| | | | | |
|---|---|---|---|---|
| 5,382,931 | A | 1/1995 | Piloto et al. | |
| 8,648,676 | B2 | 2/2014 | Abhari et al. | |
| 10,340,568 | B2 | 7/2019 | Torpey et al. | |
| 2017/0001233 | A1 | 1/2017 | Walz et al. | |
| 2024/0213644 | A1* | 6/2024 | Tani | H01P 3/08 |

FOREIGN PATENT DOCUMENTS

| | | | |
|---|---|---|---|
| EP | 3200271 | A1 | 8/2017 |
| WO | 2021/019567 | A1 | 2/2021 |

OTHER PUBLICATIONS

Howell et al.; Low Loss, High Performance 1-18 GHz SPDT Based on the Novel Super-Lattice Castellated Field Effect Transistor (SLCFET); 2014 (Year: 2014).*

(Continued)

*Primary Examiner* — Stephen E. Jones
(74) *Attorney, Agent, or Firm* — KATTEN MUCHIN ROSENMAN LLP

(57) ABSTRACT

The dynamic ultra-selective waveguide filter (DUST) assembly includes a stack of a plurality of substrate integrated waveguide (SIW) filters, each of which includes a first and second conductive layers, a dielectric layer disposed between the first and second conductive layers to form a waveguide between an input port and an output port, and a plurality of conductive couplers that interconnect the first conductive layer and the second conductive layer through the dielectric layer. The DUST assembly further includes a switch network coupled to the stack of the SIW filters to provide discretely switched tuning or continuous tuning. The switch network includes Super Lattice Castellated Field Effect Transistor (SLCFET) switches to operate the discretely switched tuning or the continuous tuning.

18 Claims, 11 Drawing Sheets

(56) References Cited

OTHER PUBLICATIONS

International Search Report and Written Opinion of the International Searching Authority mailed Nov. 17, 2025, in the International Patent Application Number PCT/US2025/042131, 16 sheets.
Hou Fang et al: "Micropackaged Compact Switchable Filters With High Isolation in 3-D TSV-MEMS Process", IEEE Transactions on Components, Packaging and Manufacturing Technology, IEEE, USA, vol. 11, No. 4, Mar. 24, 2021 (Mar. 24, 2021), pp. 647-654, XP011851357, ISSN: 2156-3950, DOI:10.1109/TCPMT.2021.3068419 [retrieved on Apr. 23, 2021] sec. II; p. 648-p. 650 sec. V; p. 653 figures 2, 3, 5.
Yuhao Zhang et al: "GaN FinFETs and trigate devices for power and RF applications: review and perspective", Semiconductor Science Technology, IOP Publishing Ltd, GB, vol. 36, No. 5, Mar. 31, 2021 (Mar. 31, 2021), p. 54001, XP020365850, ISSN: 0268-1242, DOI:10.1088/1361-6641/ABDE17 [retrieved on Mar. 31, 2021] last and penultimate paragraphs; p. 11 figure 11.
Parke Justin et al: "High-Performance SLCFETs for Switched Filter Applications", 2016 IEEE Compound Semiconductor Integrated Circuit Symposium (CSICS), IEEE, Oct. 23, 2016 (Oct. 23, 2016), pp. 1-4, XP033004573, DOI: 10.1109/CSICS.2016.7751044 [retrieved on Nov. 21, 2016] abstract figure 3.
Howell Robert S et al: "GaN SLCFET Technology for Next Generation mmW Systems, Demonstrating Pout of 10.87 W/mm With 43% PAE at 94 GHz", IEEE Microwave and Wireless Technology Letters, IEEE, vol. 33, No. 6, Jun. 1, 2023 (Jun. 1, 2023), pp. 839-842, XP011942121, ISSN: 2771-957X, DOI:10.1109/LMWT.2023.3271862 [retrieved on May 9, 2023] abstract sec. II; p. 839-p. 840 figure 1.

* cited by examiner

DYNAMIC ULTRA-SELECTIVE WAVEGUIDE FILTER ASSEMBLY

BACKGROUND

Filter performance has increasingly become a determinate bottleneck in ultimate system performance for next generation radiofrequency (RF) receiver architectures. This bottleneck arises from the intersection of several simultaneous and related occurrences: the proliferation of high-performance Complementary Metal-Oxide Semiconductor (CMOS) technology and the ever-increasing RF spectrum crunch. The increasing capabilities of digital CMOS has made direct sample receiver architectures viable for mission systems leveraging increasing frequency and bandwidth.

With reference to FIGS. 1A-1B, shown are exemplary diagrams of a superheterodyne-based sampling architecture and a direct sampling-based architecture, respectively. The superheterodyne-based sampling architecture 100 includes a series of one or more bandpass filters 101, mixers 102, low noise amplifiers (LNAs) 103, and analogue to digital converter (ADC) 104. The direct sampling-based architecture 100' includes low noise amplifier (LNA) 103 and ADC 104. The flexibility and adaptability of direct sampling-based architectures 100' enable them to be repurposed in-mission, and their lower component count and improved SWaP (size, weight, and power) have made them attractive for many systems including reliability-critical platforms. However, moving away from the superheterodyne receiver-based architectures 100 of past systems has posed a hardware challenge. For all short-comings of a superheterodyne architecture such as increased component count and mixer nonlinearity, the up-down signal conversion of these systems served to separate signals of interest from close-in interfering signals (see FIG. 1A). The increased spacing of those mixed signals greatly simplifies the filtering task, whereas the direct digital sampling approach requires fewer components overall, but also requires much higher performance RF filters to successfully isolate the signals of interest from close-in interfering signals.

SUMMARY

In order to solve the need for a small, high performance, dynamic RF filters, the disclosed invention provides a discretely switched or continuously tunable dynamic ultra-selective tunable waveguide filter (DUST) assembly. DUST assemblies leverage high linearity gain amplifiers to create a linear passband across all filter channels. The DUST assemblies of the disclosed invention solve issues in the SWaP (size, weight, and power) of the current state of the art for switched filter technology. They also solve the variable passband/poor linearity of the varactor based tuning solutions. The DUST assemblies of the disclosed invention utilize a heterogeneous solution leveraging Super Lattice Castellated Field Effect Transistor (SLCFET) switches, SLCFET low noise amplifiers (LNAs), and substrate integrated waveguide (SIW) filter technology to create dynamic, high linearity, high RF performance filters that include a single, discretely switched, high linearity filter assembly at a small size and a single, continuously tunable, high linearity filter assembly at a small size that can operate over multiple octaves.

These advantages and others are achieved, for example, by a dynamic ultra-selective waveguide filter assembly that includes a stack of a plurality of substrate integrated waveguide (SIW) filters and a switch network coupled to the stack of the SIW filters to provide discretely switched tuning or continuous tuning. Each of the SIW filter includes a first conductive layer, a second conductive layer, a dielectric layer disposed between the first and second conductive layers to form a waveguide between an input port and an output port, and a plurality of conductive couplers that interconnect the first conductive layer and the second conductive layer through the dielectric layer. The conductive couplers are arranged in the dielectric layer to form an outline of the waveguide. The switch network includes a Monolithic Microwave Integrated Circuits (MMIC) that includes a plurality of Super-Lattice Castellated Field Effect Transistor (SLCFET) switches to operate the discretely switched tuning or the continuous tuning.

The dielectric layer may include alumina ($Al_2O_3$). The dielectric layer may include a tunable material that changes a relative permittivity of the dielectric layer in response to an applied voltage. The tunable material may include barium strontium titanate (BST). The dynamic ultra-selective waveguide filter assembly may further include at least one pair of electrodes to apply voltage to the tunable material.

Each of the SLCFET switches may include a plurality of nanoribbons that interconnect a source electrode and a drain electrode of the SLCFET switch, and a gate electrode of the SLCFET switch may be formed on the nanoribbons. The nanoribbons of the SLCFET switch may be configured to have different threshold voltages. The nanoribbons of the SLCFET switches May have different dimensions. The nanoribbons of the SLCFET switches may have different widths. The switch network may include a plurality of low noise amplifiers (LNA) coupled to the SLCFET switches.

BRIEF DESCRIPTION OF THE DRAWINGS

The preferred embodiments described herein and illustrated by the drawings hereinafter are included to illustrate and not to limit the invention, where like designations denote like elements.

DETAILED DESCRIPTION

Figure 1A:
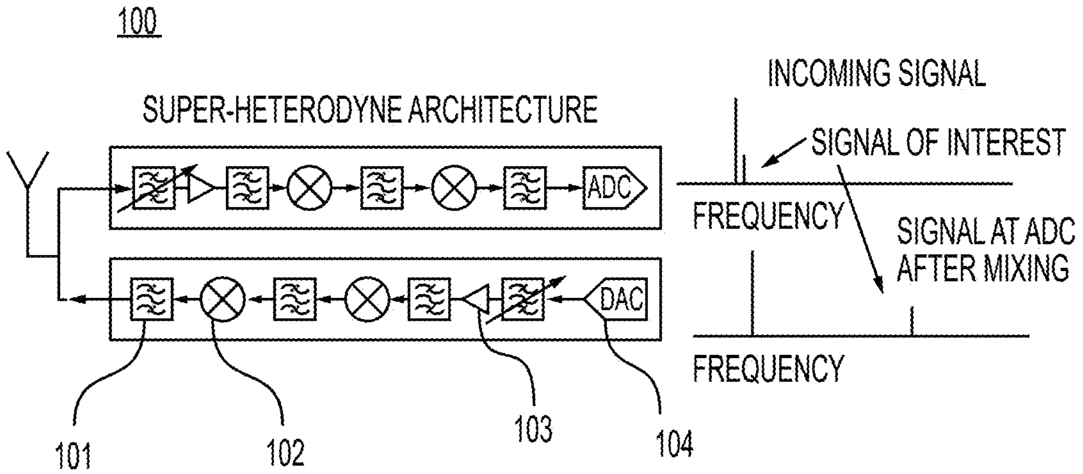
FIGS. 1A-1B are exemplary diagrams of a superheterodyne-based sampling architecture and a direct sampling-based architecture, respectively.
Figure 1B:
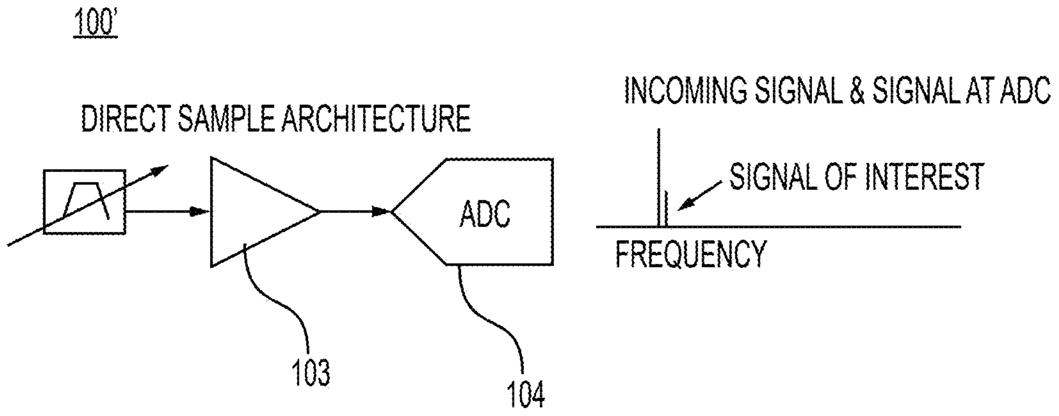

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims. It is also to be understood that the drawings included herewith only provide diagrammatic representations of the presently preferred structures of the present invention and that structures falling within the scope of the present invention may include structures different than those shown in the drawings.

Air cavity waveguide filters represent the pinnacle of filter performance when it comes to insertion loss, power handling, temperature stability, and operational frequency range. Cavity waveguide filters using air as the dielectric medium through which the electro-magnetic (EM) waves propagate have the highest available filter's quality factor (Q), which provides for exceptional %-bandwidth ranges and tight selectivity/attenuation in the filters' stop bands. This stands true when compared against all other filter technologies such as stripline, microstrip, acoustic, suspended stripline, lumped element (chip and wire), and ceramic resonator filters. However, the challenges of using an air cavity waveguide derive directly from its benefits: the air dielectric makes the filter physically larger than all other filter technologies. The other challenge is cost. Air cavity waveguide filters need to be hand tuned with the use of tuning rods or screws. This is time consuming, costly process is required for each filter.

The discloses invention utilizes a substrate integrated waveguide (SIW) filter loaded with a dielectric layer. This combines the attributes of air cavity high quality factor (Q), high power handling, low insertion loss, high selectivity, and steep stop band attenuation. SIW filters are dielectrically loaded, which enables the size of the waveguide to be reduced based on the Dk (dielectric constant) of the dielectric material at the cost of a slight performance reduction primarily driven by the electrical dissipation factor (loss tangent) of the dielectric, as the waves no longer propagate through air but through a lossy material with a specific loss-tangent. However, the SIW filters can be more than an order of magnitude smaller and require no post-fab hand tuning, significantly reducing the cost. The SIW filters have dominant performance characteristics and are much simpler to design and fabricate compared to other filter technologies.

Thin and stackable SIW filters can be fabricated using thin film and semiconductor processing techniques. Creating the SIW filters using thin film and semiconductor processing techniques enables compact filters that are thin and can be stacked on top of each other, enabling the creation of a compact filter bank that can then be joined with an RF switch Monolithic Microwave Integrated Circuits (MMIC) for individual filter selection for a far more compact solution than current state of practice high selectivity tunable filtering.

Figure 2:
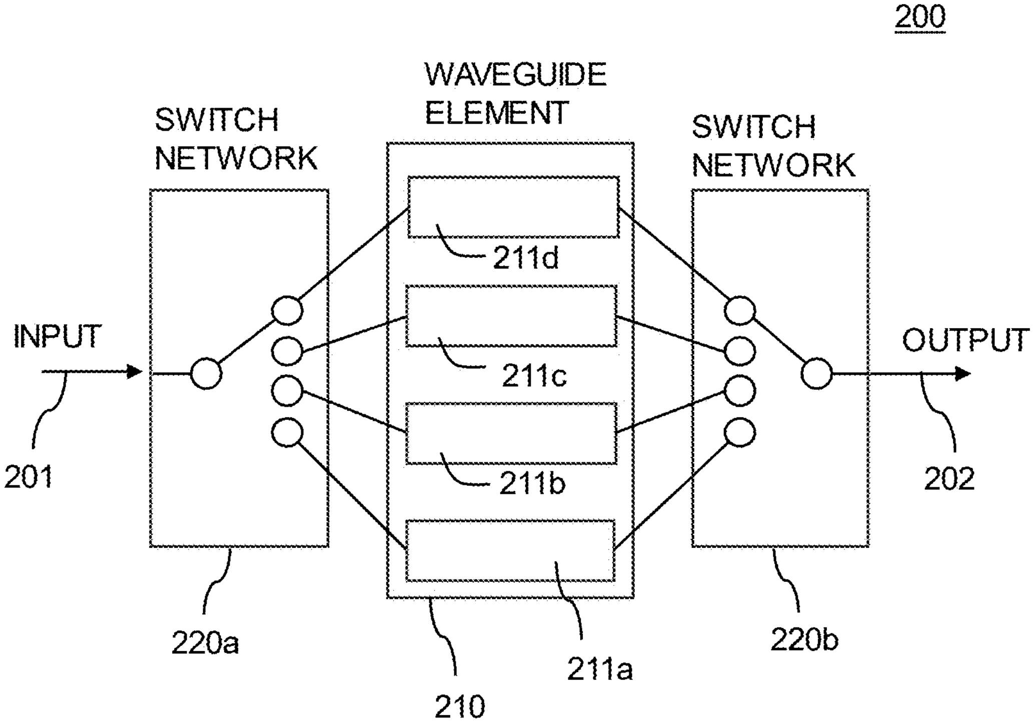
FIG. 2 is a diagram of a dynamic ultra-selective waveguide filter (DUST) assembly of the disclosed invention.

With reference to FIG. 2, shown is a diagram of dynamic ultra-selective waveguide filter (DUST) assembly 200 of the disclosed invention. The DUST assembly 200 is configured to provide discretely switched tuning or continuous multi-octave tuning. The DUST assembly 200 includes waveguide element 210 that includes a plurality of waveguide filters 211*a*-211*d*. FIG. 2 exemplarily show four (4) waveguide filters 211*a*-211*d*. However, any number of waveguide filters can be employed in the waveguide element 210. The waveguide filters 211*a*-211*d* have functionality of filtering RF signals with certain frequencies. Different waveguide filters 211*a*-211*d* may filter RF signals with different frequencies. The waveguide filters 211*a*-211*d* of the disclosed invention may include SIW filters. The DUST assembly 200 further includes switch networks 220*a*, 220*b* coupled to the waveguide element 210. The first switch network 220*a* receives incoming RF signals 201 and routes them to the waveguide filters 211*a*-211*d*. The second switch network 220*b* receives output RF signals from the waveguide filters 211*a*-211*d* and outputs 202 the signals. In the disclosed invention, each switch network 220*a*, 220*b* includes at least one Monolithic Microwave Integrated Circuits (MMIC) comprising a plurality of Super-Lattice Castellated Field Effect Transistor (SLCFET) switches to operate the discretely switched tuning or the continuous tuning.

Figure 3A:
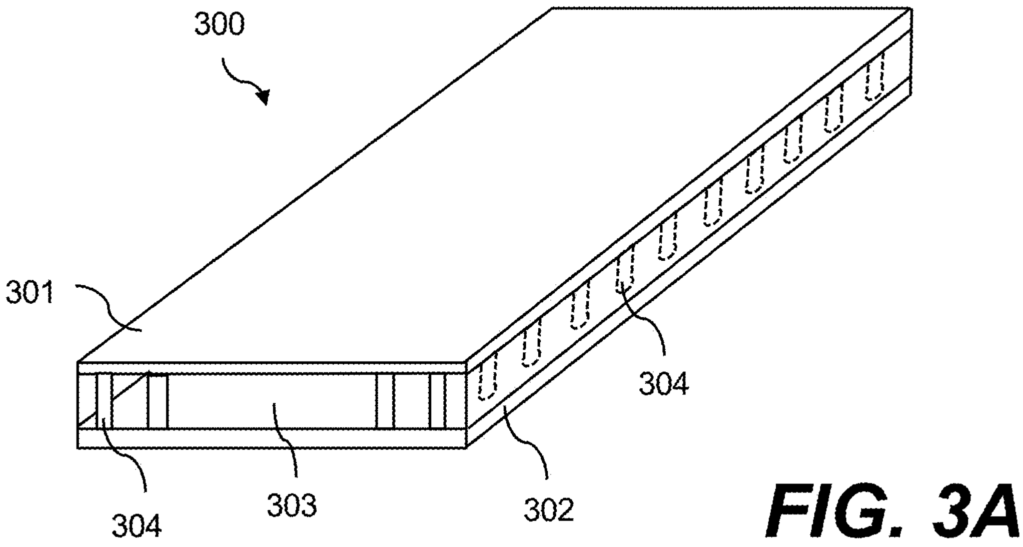
FIG. 3A-3C are a perspective view, a top view, and a side view of a substrate integrated waveguide (SIW) filter, respectively, which is used for the waveguide filters shown in FIG. 2.
Figure 3B:
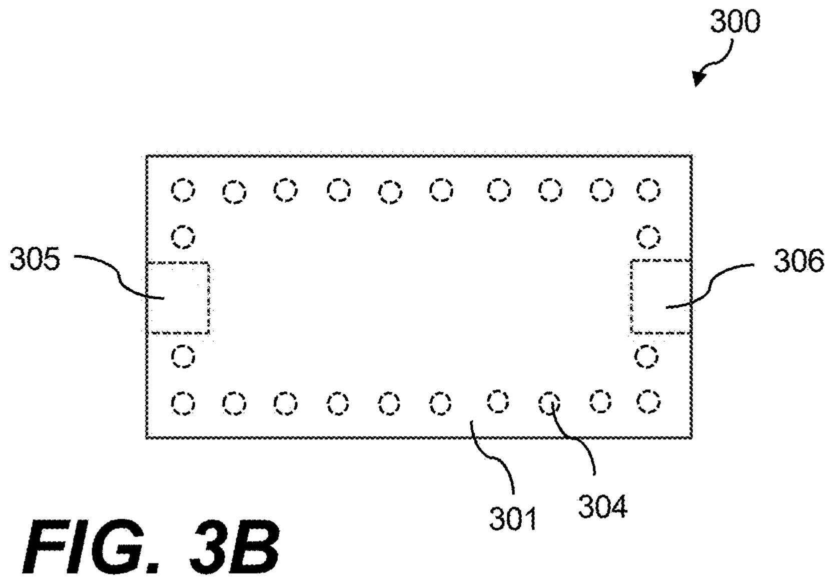
Figure 3C:
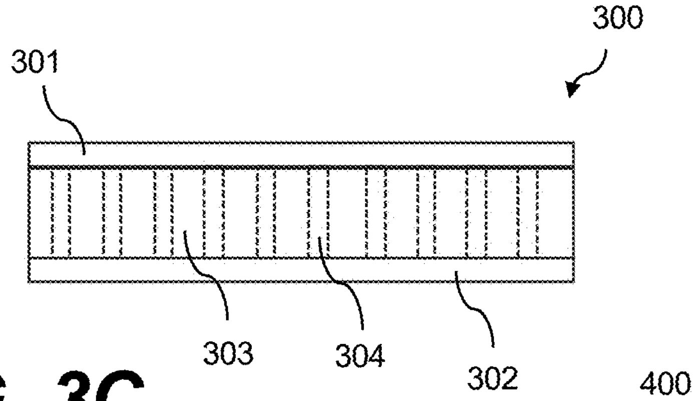

With reference to FIG. 3A-3C, shown are a perspective view, a top view, and a side view of the SIW filter 300, respectively, which may be used for the waveguide filters 211*a*-211*d* shown in FIG. 2. The DUST assembly 200 with the SIW filters 300 is configured to provide discretely switched tuning. When the SIW filters are configured to include tunable material, the DUST assembly 200 also provides continuous tuning, which is described referring to FIGS. 10A-10B. The SIW filter 300 includes first electrically conductive layer 301, second electrically conductive layer 302, dielectric layer 303 disposed between the first and second conductive layers 301, 302, and a plurality of electrically conductive couplers 304 that interconnect the first conductive layer and the second conductive layer 302 through the dielectric layer 303. The first and second conductive layers 301, 302 form a waveguide between an input port 305 and an output port 306 of the SIW filter 300. The conductive couplers 304 are arranged in the dielectric layer 303 to form a side outline of the waveguide. The conductive couplers 304 may be conductive vias. The dielectric layer 303 is formed of one or more dielectric materials. Incoming RF signals are introduced into the SIW filter 300 at the input port 305 and exit the SIW filter 300 at the output port 306. The filter types, such as a low pass filter, a high pass filter, and a band pass filter, can be configured by how the couplers 304 between the first and second conductive layers 301, 302 are arranged within the dielectric layer 303.

Figure 4:
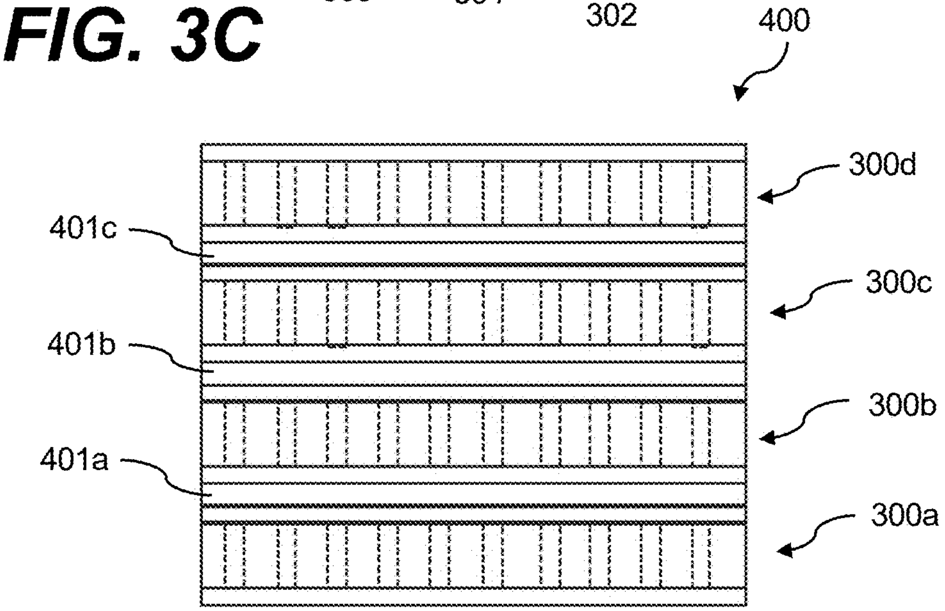
FIG. 4 is a diagram of a stack of the SIW filters.

With reference to FIG. 4, shown is a diagram of a stack 400 of the SIW filters 300*a*-300*d*. The plurality of waveguide filters 211*a*-211*d* in the waveguide element 210 shown in FIG. 2 may be arranged as the stack 400 of the SIW filters 300*a*-300*d*. The filters 300*a*-300*d* may be different types of filters or may have different filtering characteristics such as bandwidth and center frequency of filtered RF signals. The stack 400 may include electrically insulating layers 401*a*-401*c* between the SIW filters 300*a*-300*d*. FIG. 4 exemplarily shows four (4) SIW filters in the stack 400. However, any number of SIW filters may be employed in the stack 400.

Many dielectric materials for the dielectric layer 303 are viable options for fabricating thin film SIW filters. The selection of the dielectric material may be the most impactful decision in the design process. Alumina ($Al_2O_3$) may be an optimal material for the dielectric layer 303 of the SIW filters 300 of the disclosed invention, due to the low RF loss tangent of alumina (0.0001) and high dielectric constant (9.8). However, any other dielectric materials may be used for the dielectric layer 303. Examples of materials for the dielectric layer 303 includes alumina, sapphire, alumina nitride, quartz, organic materials such as Rogers 6002, 5880/5880LZ, 3010/6010, TMMi; Metgron 6, 6n, 7, 7n, and ceramic materials such as LTCC 9k7, 951, Kyocera GL331 etc.

The use of a large number of filters to create a bank of filters to cover a wide operating frequency necessitates the use of an RF switching network in any filter solution of this type. The losses of that switching network will further add to the losses of the filters, and require further gain to counterbalance. As additional gain increases the non-linearity of the overall system, it is desirable to use a low loss RF switch process, and it is further desirable to use one with an amplifier that offers the benefits of high linearity performance for a minimum of consumed power. An excellent candidate for this is to use the Super Lattice Castellated Field Effect Transistor (SLCFET) process, which offers both of these capabilities.

Figure 5:
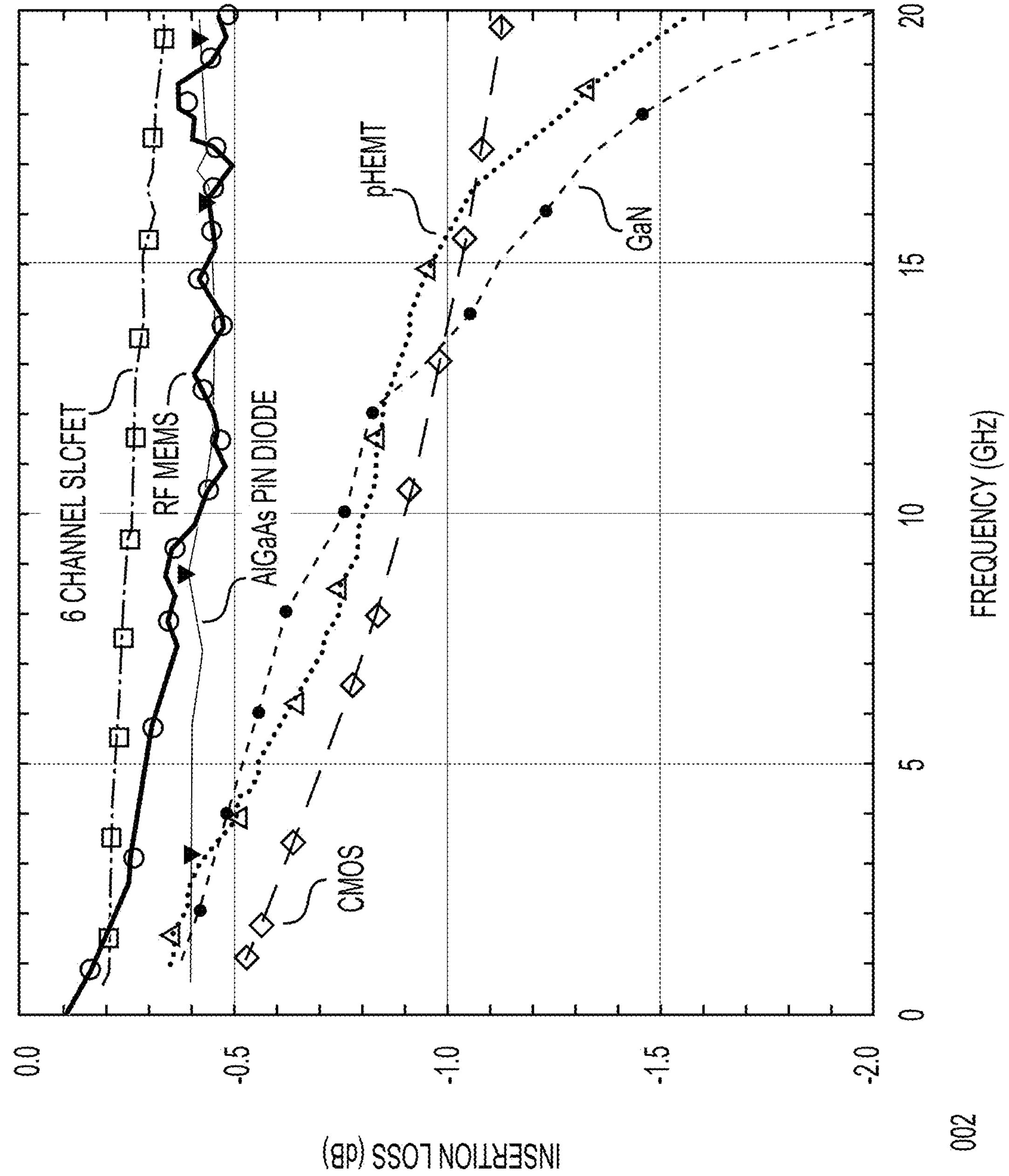
FIG. 5 shows insertion loss data of 6 channel SLCFET, MEMS, PIN diode, CMOS, pHEMT, and GaN based switches over frequency.

The 3S SLCFET RF switches are used for the switch networks 220*a*, 220*b* of the disclosed invention. The 3S SLCFET RF switch process is qualified and released technology readiness level (TRL) 6 and manufacturing technology readiness (MRL) 6 processes. These SLCFET switches have demonstrated RF switch figure of merit cutoff frequency (FCO) greater than 2 THz, which is 3-6 times greater than reported for other transistor-based RF switches. SLCFET switches provides wideband RF SPDT (single pole double throw) performance on par with RF MEMS and PiN diode switches and far exceeding that of conventional FET-based RF switches. FIG. 5 shows insertion loss data of 6 channel SLCFET, MEMS, PIN diode, CMOS, pHEMT, and GaN based switches over frequency. Inset in FIG. 5 show micrograph of SLCFET structure. SLCFET single pole double throw RF switches outperform MEMS, pin-diode, and FET based approaches. The 3S SLCFET process has now been successfully co-integrated with a 0.1 μm T-gate amplifier process that has shown great promise for high-performance receiver applications.

Figure 6A:
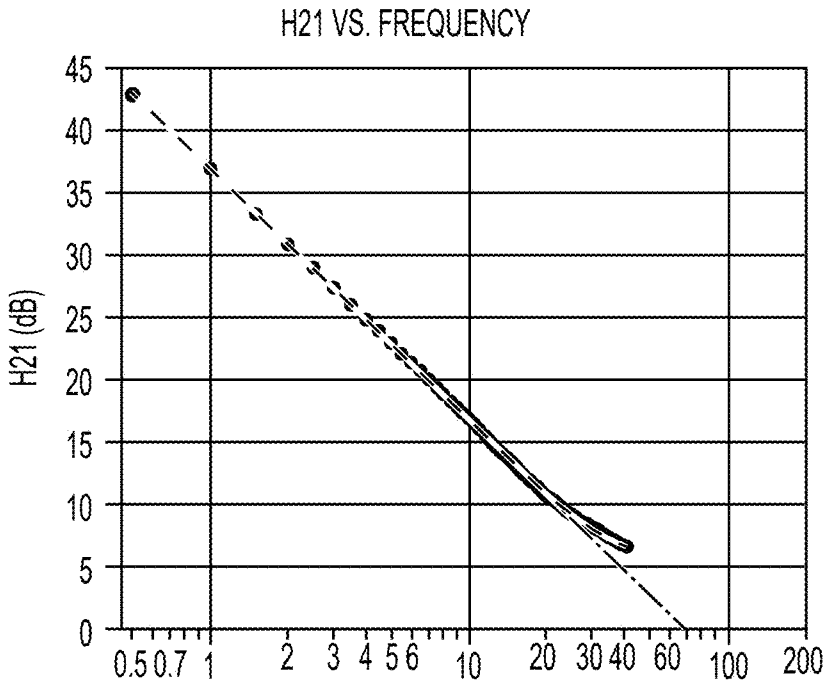
FIGS. 6A-6C show SLCFET amplifier characteristics for low noise amplifier (LNA) applications from the current process design kit (PDK), showing (a) peak Ft=70 GHz (FIG. 6A); (b) peak Fmax=100 GHz (FIG. 6B); and (c) NFmin at 10 GHz as a function of device bias, achieving NFmin<1.5 dB (FIG. 6C).
Figure 6B:
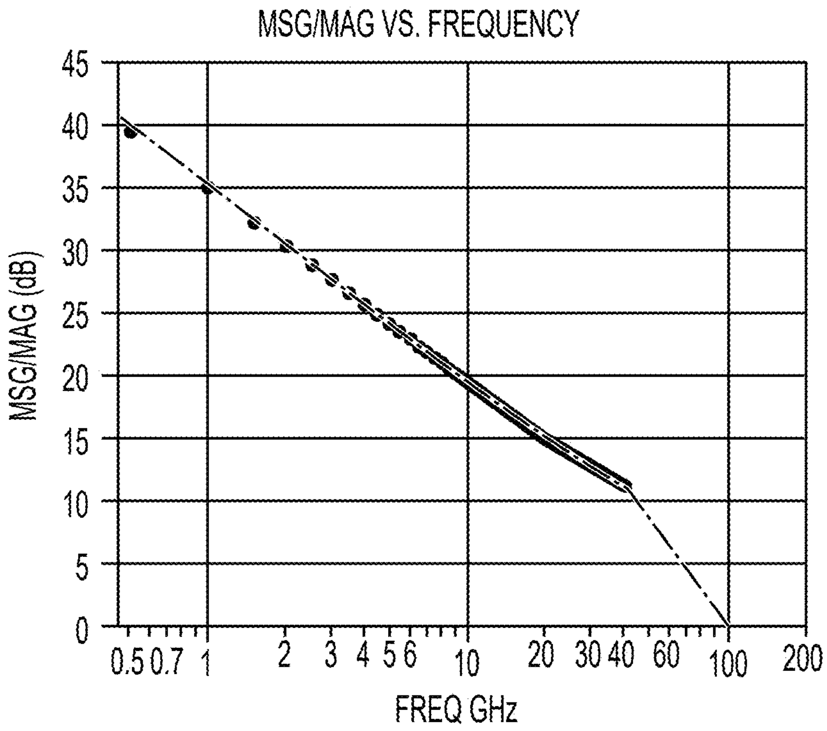
Figure 6C:
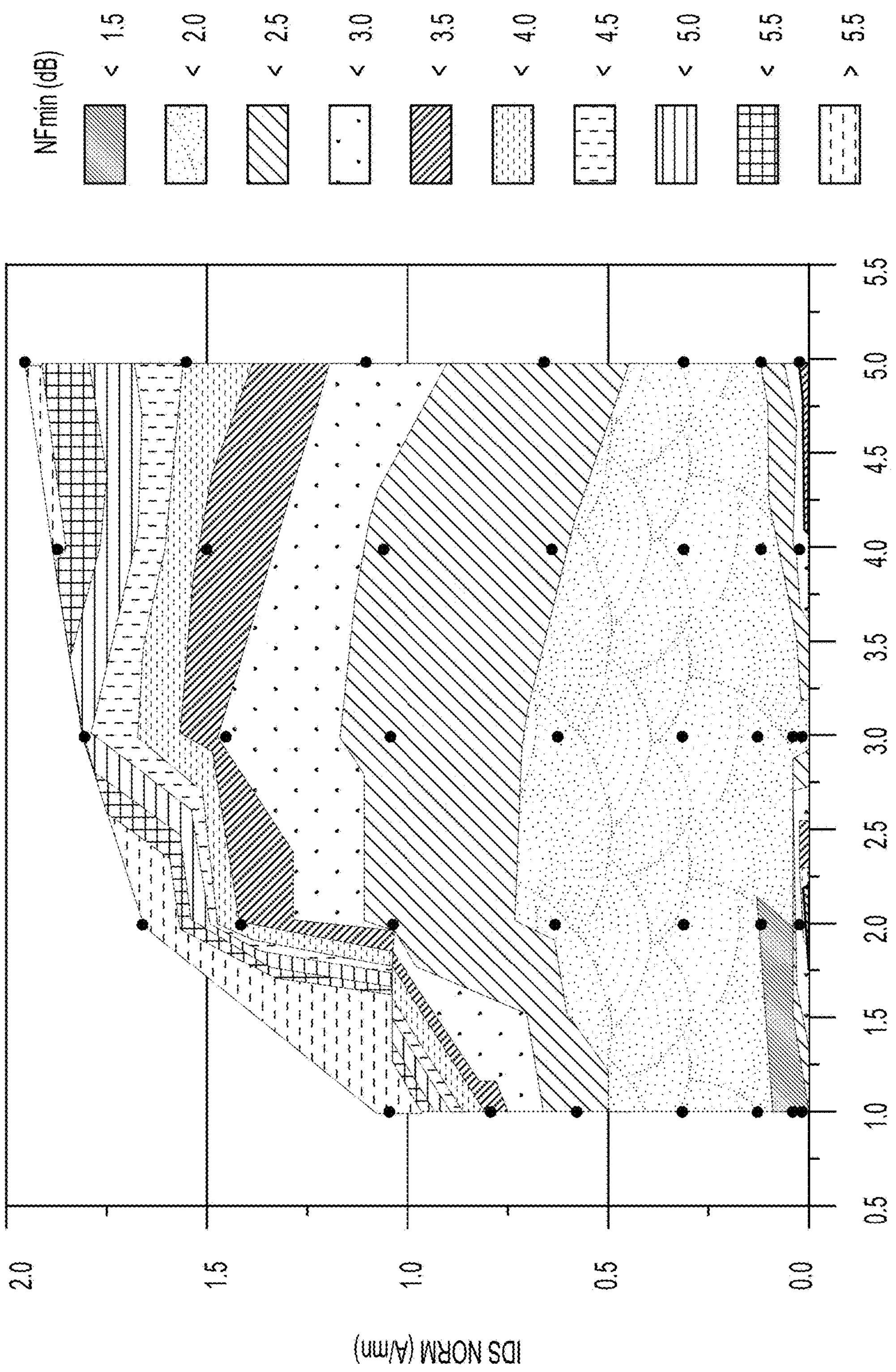

With reference to FIGS. 6A-6C, shown are SLCFET amplifier characteristics for low noise amplifier (LNA) applications from the current process design kit (PDK), showing (a) peak Ft=70 GHz (FIG. 6A); (b) peak Fmax=100 GHz (FIG. 6B); and (c) NFmin at 10 GHz as a function of device bias, achieving NFmin<1.5 dB (FIG. 6C). The SLCFET amplifier process is presently TRL 4, and is undergoing continuing development and improvement, with a process variant that has demonstrated $f_T$ of 76 GHz and an Fmax of 130 GHz, with an NFmin at 10 GHz of 0.7 dB.

Figure 7A:
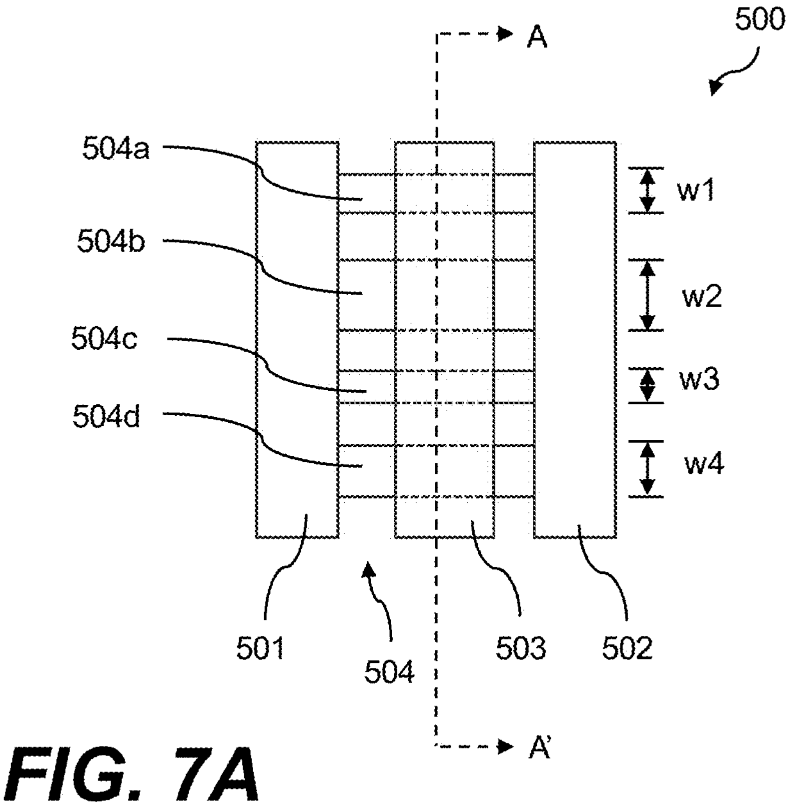
FIG. 7A is a top view of the structure of a SLCFET switch employed in the switch network of the DUST assembly of the disclosed invention.
Figure 7B:
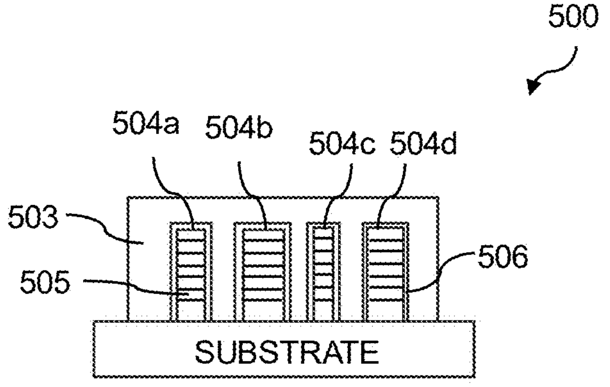
FIG. 7B is a cross-sectional view of the structure of the SLCFET switch along the line A-A' shown in FIG. 7A.
Figures 8A, 8B:
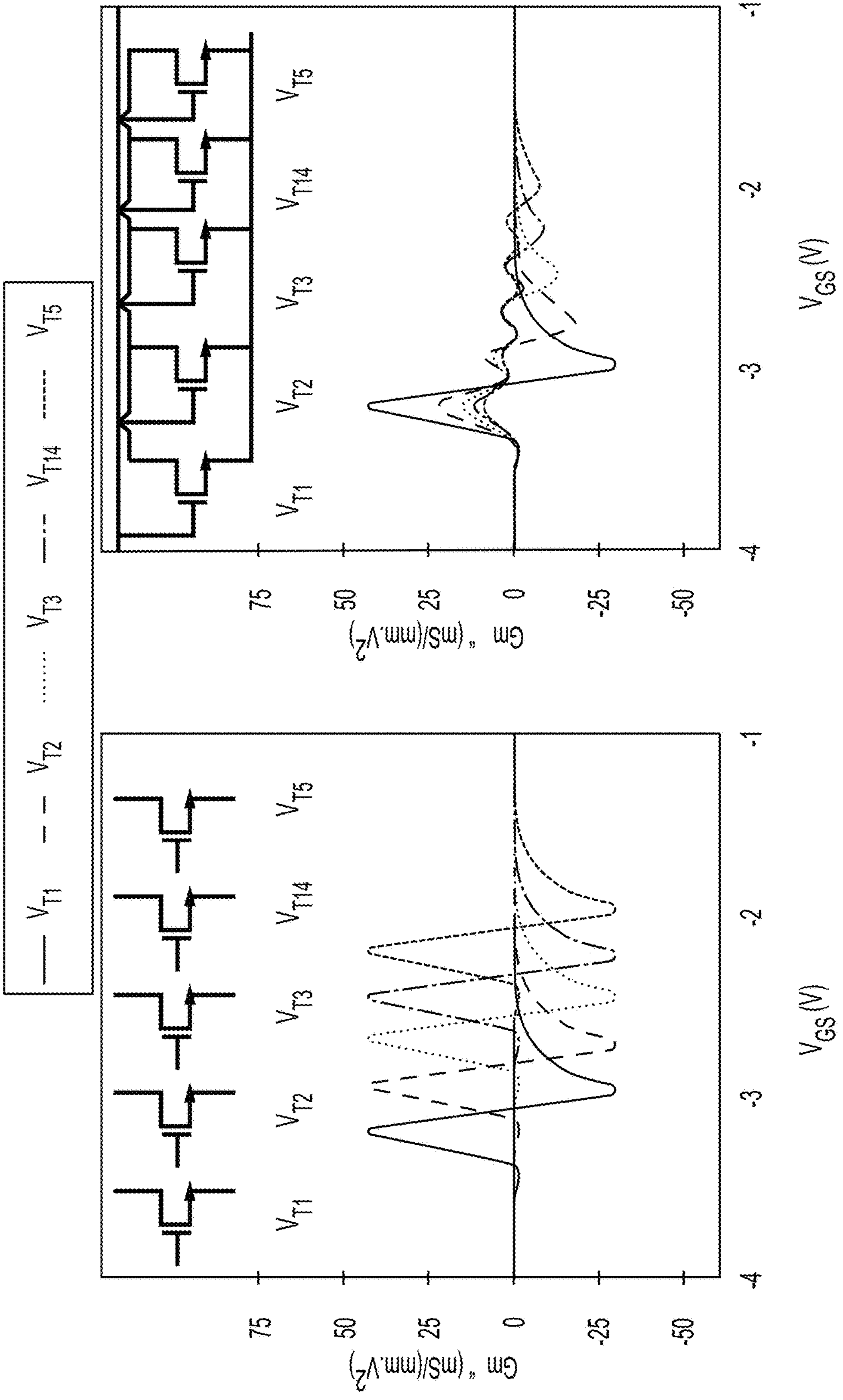
FIG. 8A illustrates transconductance data of transistors with different threshold voltages.
FIG. 8B illustrates transconductance data of the transistors of FIG. 8A when the transistors with different threshold voltages are combined to create a more linear output through super-position of the individual characteristics.
Figure 9:
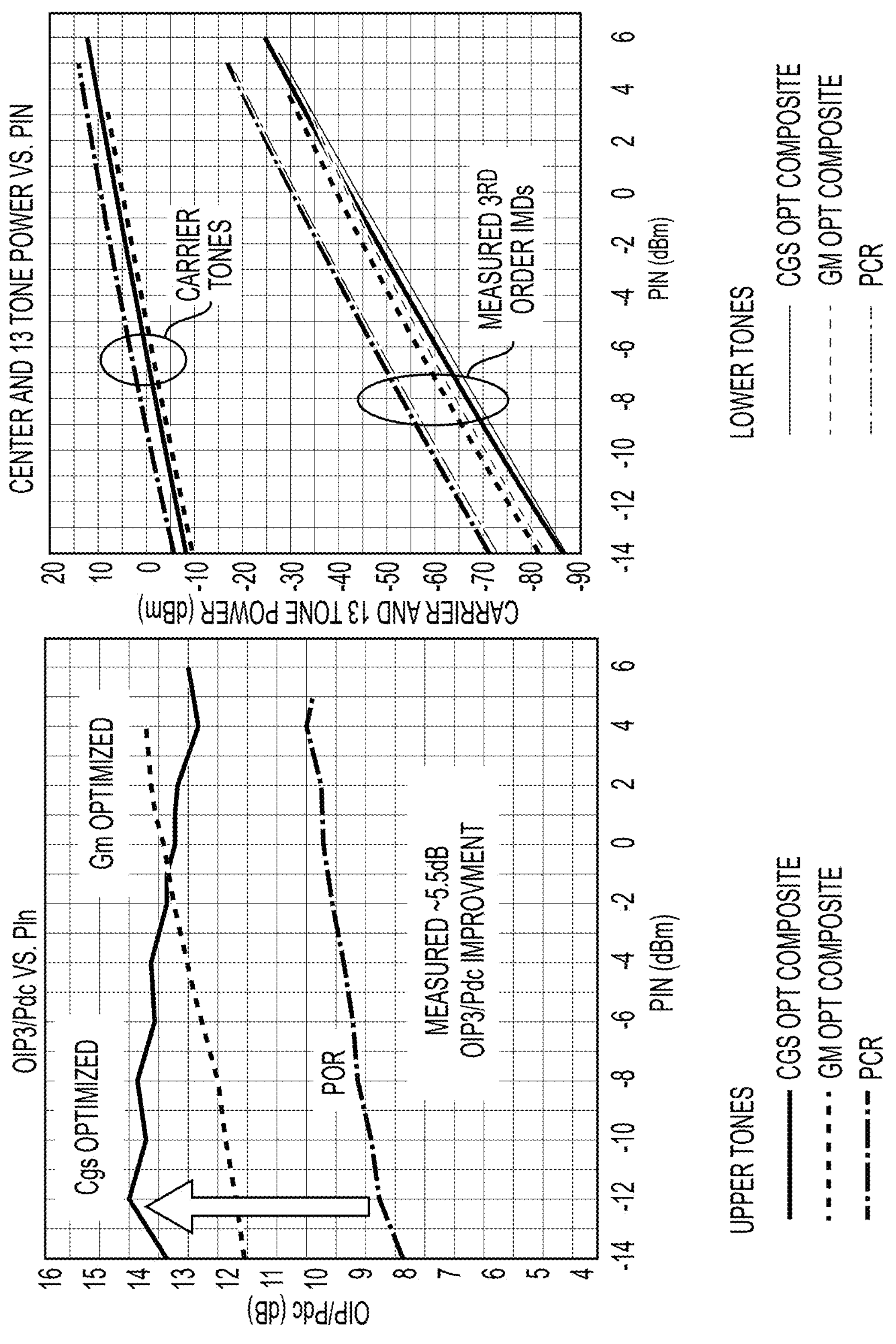
FIG. 9 illustrates measured, third-order linearity of SLCFET amplifier test cells with nanoribbons individually designed to optimize linearity from gate-source capacitance ($C_{GS}$) behavior or transconductance ($g_m$) behavior, compared against the behavior of uniformly shaped nanoribbons from the SLCFET process of record.

With reference to FIG. 7A, shown is a top view of the structure of the SLCFET switch 500 employed in the switch networks 220*a*, 220*b* of the DUST assembly 200 of the disclosed invention. With reference to FIG. 7B, shown is a cross-sectional view of the structure of the SLCFET switch along the line A-A' shown in FIG. 7A. With reference to FIG. 8A, shown is transconductance data of transistors with different threshold voltages. With reference to FIG. 8B, shown is transconductance data of the transistors of FIG. 8A when the transistors with different threshold voltages are combined to create a more linear output through super-position of the individual characteristics. With reference to FIG. 9, shown is measured third order linearity of SLCFET amplifier test cells with nanoribbons individually designed to optimize linearity from gate-source capacitance ($C_{GS}$) behavior or transconductance ($g_m$) behavior, and compared against the behavior of uniformly shaped nanoribbons from the SLCFET process of record.

The SLCFET switch 500 includes source electrode 501, drain electrode 502, gate electrode 503, and nanoribbon structure 504. Nanoribbons 504*a*-504*d* with superlattice 505 are formed as channels interconnecting the source and drain electrodes 501, 502. Gate electrode 503 is formed on the dielectric layer 506 covering the nanoribbons 504*a*-504*d*. The superlattice 505 may be, for example, alternating layers of aluminum gallium nitride (AlGaN) and gallium nitride (GaN).

The nanoribbon structure 504 of the SLCFET switch 500 offers unique opportunities to provide higher linearity amplification for a smaller amount of power consumption. Each nanoribbon 504*a*-504*d* within the SLCFET switch 500 may be considered as an independent transistor. Individual shape or dimension of each nanoribbon 504*a*-504*d* dictates its threshold voltage and operating characteristics, such as transconductance ($g_m$) and capacitances ($C_{GS}$, $C_{GD}$). The non-linear harmonic generation of a transistor is a function of the second derivative of both transconductance ($g_m$) and gate-source capacitance (Cas) characteristics, and by paralleling transistors with different threshold voltages, these non-linearities can be designed to cancel each other. FIG. 8A shows graphs of transconductance ($g_m$) of individual transistors. FIG. 8B shows graphs of transconductance ($g_m$) of transistors when the transistors are combined. FIG. 8B indicates that combining transistors with different threshold voltages creates a more linear output through super-position of the individual characteristics.

The nanoribbon 504*a*-504*d* of the SLCFET switch 500 are constructed to have different dimensions to provide higher linearity amplification. For example, as shown in FIGS. 7A-7B, the nanoribbons 504*a*-504*d* may have different width w1-w4. The dimensions of the SLCFET nanoribbon 504*a*-504*d* are determined by the e-beam write of that level. All of the nanoribbons or some of the nanoribbons may have different dimensions. The nanoribbon 504*a*-504*d* with different dimensions provide different switching characteristics such as different threshold voltage. FIGS. 7A-7B exemplarily show four (4) nanoribbons, but any number of nanoribbons may be formed in the SLCFET switch 500.

Combining nanoribbons with different characteristics in the same device creates a composite device with more linear performance. FIG. 9 demonstrates the measured linearity of SLCFET device cells fabricated using the composite nanoribbon structure, with an example optimized for linear gate-source capacitance (Cas) and one optimized for linear transconductance ($g_m$) compared against the process of record SLCFET process that uses uniform nanoribbons. The optimized behavior of the gate-source capacitance (Cas) is the most promising, achieving an OTOI/PDC figure of merit of 14 dB at the low (receiver level) input powers, almost 4 times better linearity per unit of power consumption than the process of record performance. Integrating this highly linear amplifier with the RF switching network and high performance ultra selective thin film waveguide filters provides the compact, high linearity, low power consumption filtering solution desired to isolate signals of interest in next generation receiver architectures.

Figure 10A:
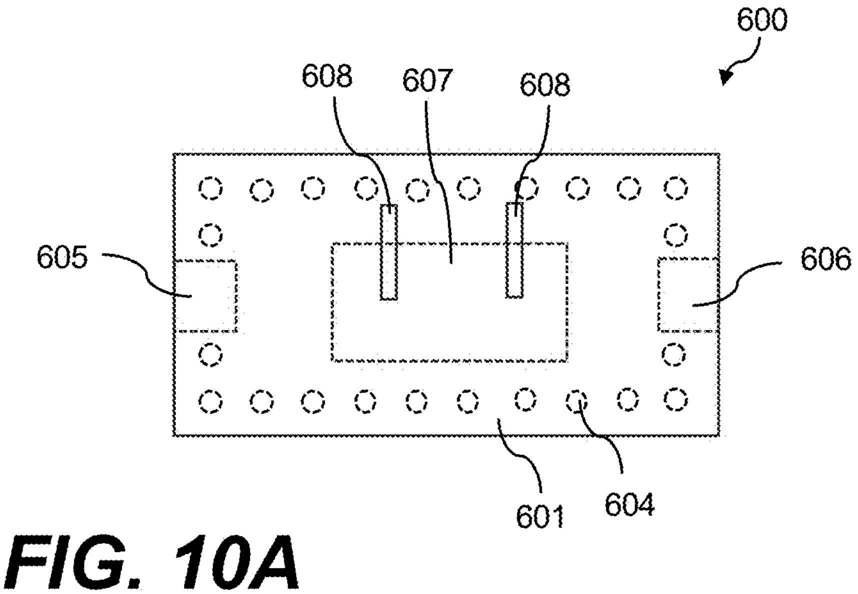
FIGS. 10A-10B are a top view and a side view of a SIW filter, respectively, which is used for the waveguide filter of another embodiment of the DUST assembly that is configured to provide continuous tuning.
Figure 10B:
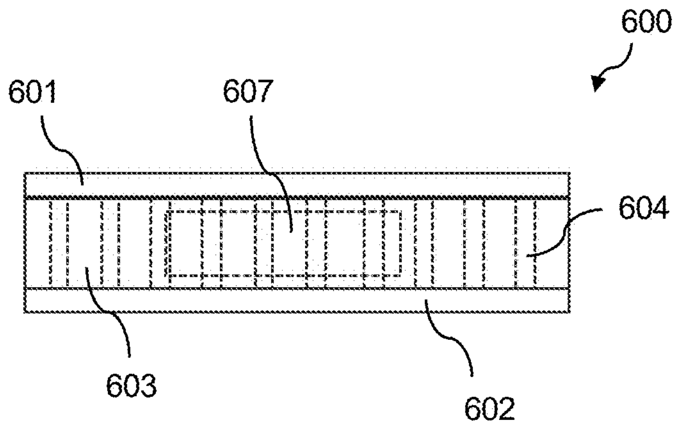

With reference to FIGS. 10A-10B, shown are a top view and a side view of the SIW filter 600, respectively, which is used for the waveguide filter 211*a*-211*d* of another embodiment of the DUST assembly 200. The DUST assembly 200 with the SIW filters 600 is configured to provide continuous multi-octave tuning, while the DUST assembly 200 with the SIW filters 300 is configured to provide discretely switched tuning.

The SIW filter 600 includes first electrically conductive layer 601, second electrically conductive layer 602, dielectric layer 603 disposed between the first and second conductive layers 601, 602, and a plurality of electrically conductive couplers 604 that interconnect the first and second conductive layers 601, 602 through the dielectric layer 603. The first and second conductive layers 601, 602 form a waveguide between an input port 605 and an output port 606 of the SIW filter 600. The conductive couplers 604 are arranged in the dielectric layer 603 to form a side outline of the waveguide. The conductive couplers 604 may be conductive vias. The dielectric layer 603 is formed of one or more dielectric materials. The dielectric layer 603 may include alumina ($Al_2O_3$). Incoming RF signals are introduced into the SIW filter 600 at the input port 605 and exit the SIW filter 600 at the output port 606.

The SIW filter 600 further includes tunable material or layer 607 disposed in the dielectric layer 603, and at least one pair of electrodes 608 to apply voltage to the tunable material 607. The tunable material 607 changes a relative permittivity of the dielectric layer 603 in response to an applied voltage. The tunable material may be barium strontium titanate $BaSrTiO_3$ (BST). However, any dielectric material, which has capability of changing its relative permittivity responding to applied voltage, may be used for the tunable material 607. For example, the tunable material or layer 607 may be doped BST and plasma and may be frequency selective surfaces (FSS).

The tunable material 607 may be formed as one or more tunable vias. In one embodiment, the tunable material 607 may be provided as a single via that substantially fills a cavity of the dielectric layer 603. In another embodiment, the tunable material 607 can be formed throughout the dielectric layer 603. When the tunable material is formed in multiple vias, separate pairs of electrodes 608 may be provided for each of the separate vias respectively.

Figure 11A:
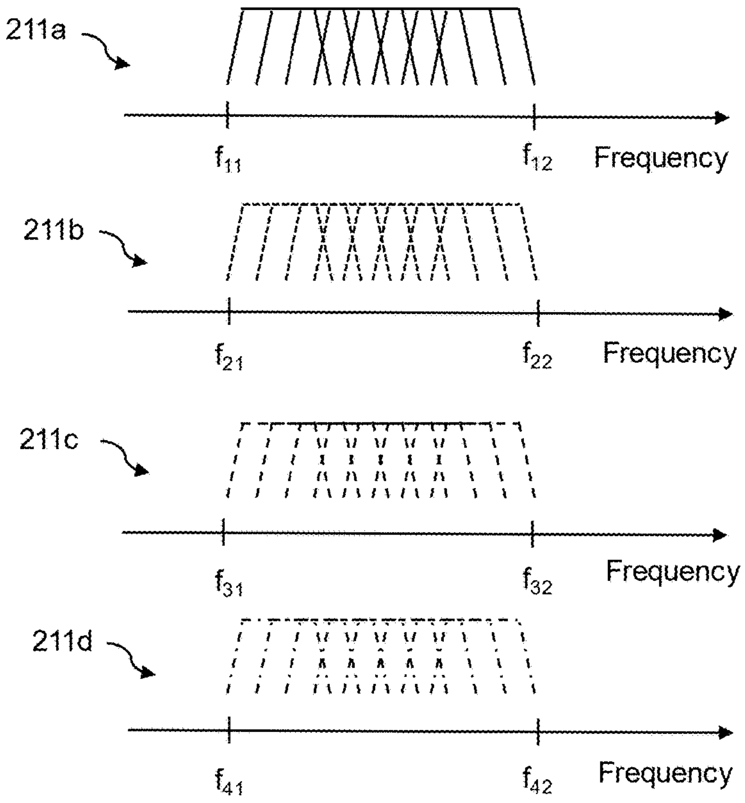
FIG. 11A illustrates exemplary frequency bands of the waveguide filters shown in FIG. 2.
Figure 11B:
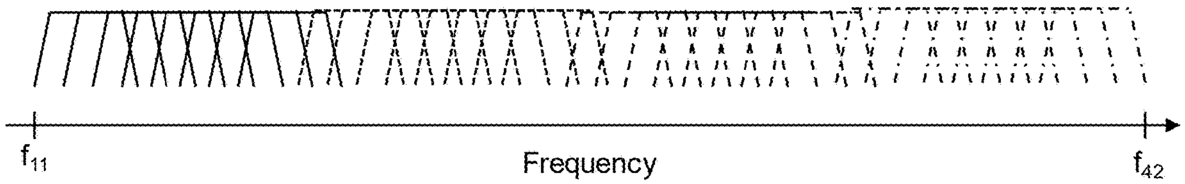
FIG. 11B illustrates an exemplary diagram of an expanded frequency band of the waveguide element when multiple waveguide filters are added in the waveguide element.

With reference to FIG. 11A, shown are exemplary diagrams of frequency bands of the waveguide filters 211*a*-211*d* shown in FIG. 2. With respect to FIG. 11B, shown is an exemplary diagram of an expanded frequency band of the waveguide element 210 when multiple waveguide filters 211*a*-211*d* are added in the waveguide element 210. By adding more waveguide filters to the SLCFET switched matrix, the frequency range of coverage is expanded from sub-octave to multi-octave.

Leveraging tunable materials provides a means to reduce the complexity of the RF switching network as fewer discrete filter elements are required to span a given frequency range. This improves size, cost, reliability, and potentially performance of the overall filter system. Barium Strontium Titanate (BST) is an established tunable dielectric material, which has a high dielectric constant of about 300 that can be modulated by the application of a bias voltage and negligible current.

The incorporation of a BST layer into each waveguide filter provides a means to modulate capacitance and provide low-power control of the center frequency of the waveguide filter. In-house grown BST has demonstrated a dielectric tunability grater than 40%, enabling substantial sub-octave frequency tuning while maintaining the filter's constant percent bandwidth and sharp selectivity. While the integration of BST may slightly increase dissipation (tan $\delta_{BST} \approx 0.02$), this is offset by architectures that minimize the number of required BST capacitors and the use of low-loss, highly linear SLCFET switches described above. The BST-enabled tunable SIW filters are a prime candidate for combination with a highly efficient SLCFET switching network, allowing the filter system to tune over a wide band and multi-octave frequency spectrum quickly and precisely.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A dynamic ultra-selective waveguide filter assembly, comprising:
- a stack of a plurality of substrate integrated waveguide (SIW) filters, wherein each SIW filter comprises:
  - a first conductive layer;
  - a second conductive layer;
  - a dielectric layer disposed between the first and second conductive layers to form a waveguide between an input port and an output port, wherein the dielectric layer comprises a tunable material that changes a relative permittivity of the dielectric layer in response to an applied voltage; and
  - a plurality of conductive couplers that interconnect the first conductive layer and the second conductive layer through the dielectric layer, wherein the conductive couplers are arranged in the dielectric layer to form an outline of the waveguide; and
- a switch network coupled to the stack of the SIW filters to provide discretely switched tuning or continuous tuning, wherein the switch network comprises a Monolithic Microwave Integrated Circuits (MMIC) comprising a plurality of Super-Lattice Castellated Field Effect Transistor (SLCFET) switches to operate the discretely switched tuning or the continuous tuning.

2. The dynamic ultra-selective waveguide filter assembly of claim 1 wherein the tunable material comprises barium strontium titanate (BST).

3. The dynamic ultra-selective waveguide filter assembly of claim 1 further comprising at least one pair of electrodes to apply voltage to the tunable material.

4. The dynamic ultra-selective waveguide filter assembly of claim 1 wherein each SLCFET switch comprises a plurality of nanoribbons that interconnect a source electrode and a drain electrode of the SLCFET switch, wherein a gate electrode of the SLCFET switch is formed on the nanoribbons.

5. The dynamic ultra-selective waveguide filter assembly of claim 4 wherein the nanoribbons of the SLCFET switch are configured to have different threshold voltages.

6. The dynamic ultra-selective waveguide filter assembly of claim 4 wherein the nanoribbons of the SLCFET switches have different dimensions.

7. The dynamic ultra-selective waveguide filter assembly of claim 4 wherein the nanoribbons of the SLCFET switches have different widths.

8. The dynamic ultra-selective waveguide filter assembly of claim 1 wherein the switch network comprises a plurality of low noise amplifiers (LNA) coupled to the SLCFET switches.

9. A dynamic ultra-selective waveguide filter assembly, comprising:

a plurality of substrate integrated waveguide (SIW) filters, wherein each SIW filter comprises:

a first conductive layer;

a second conductive layer;

a dielectric layer disposed between the first and second conductive layers to form a waveguide between an input port and an output port; and a plurality of conductive couplers that interconnect the first conductive layer and the second conductive layer through the dielectric layer, wherein the conductive couplers are arranged in the dielectric layer to form an outline of the waveguide; and a switch network coupled to the SIW filters to provide discretely switched tuning or continuous tuning, wherein the switch network comprises a plurality of Super-Lattice Castellated Field Effect Transistor (SLCFET) switches, each SLCFET switch comprises a plurality of nanoribbons that interconnect a source electrode and a drain electrode of the SLCFET switch, a gate electrode of the SLCFET switch is formed on the nanoribbons, and the nanoribbons of the SLCFET switch are configured to provide different characteristics.

10. The dynamic ultra-selective waveguide filter assembly of claim 9 wherein the dielectric layer comprises alumina ($Al_2O_3$).

11. The dynamic ultra-selective waveguide filter assembly of claim 9 wherein the dielectric layer comprises a tunable material that changes a relative permittivity of the dielectric layer in response to an applied voltage.

12. The dynamic ultra-selective waveguide filter assembly of claim 11 wherein the tunable material comprises barium strontium titanate (BST).

13. The dynamic ultra-selective waveguide filter assembly of claim 11 further comprising at least one pair of electrodes to apply voltage to the tunable material.

14. The dynamic ultra-selective waveguide filter assembly of claim 9 wherein the nanoribbons of the SLCFET switch are configured to have different threshold voltages.

15. The dynamic ultra-selective waveguide filter assembly of claim 9 wherein the nanoribbons of the SLCFET switches have different dimensions.

16. The dynamic ultra-selective waveguide filter assembly of claim 9 wherein the nanoribbons of the SLCFET switches have different widths.

17. The dynamic ultra-selective waveguide filter assembly of claim 9 where the SIW filters are formed in a stack.

18. The dynamic ultra-selective waveguide filter assembly of claim 9 wherein the switch network comprises a plurality of low noise amplifiers (LNA) coupled to the SLCFET switches.

* * * * *